United States Patent
Gaudreau, Jr.

(10) Patent No.: US 8,496,293 B2
(45) Date of Patent: Jul. 30, 2013

(54) ENERGY-DISSIPATION SYSTEM FOR JUVENILE VEHICLE SEAT

(75) Inventor: Paul D. Gaudreau, Jr., Indianapolis, IN (US)

(73) Assignee: Cosco Management, Inc., Wilmington, DE (US)

(*) Notice: Subject to any disclaimer, the term of this patent is extended or adjusted under 35 U.S.C. 154(b) by 124 days.

(21) Appl. No.: 13/278,036

(22) Filed: Oct. 20, 2011

(65) Prior Publication Data

US 2012/0146369 A1  Jun. 14, 2012

Related U.S. Application Data

(60) Provisional application No. 61/422,573, filed on Dec. 13, 2010.

(51) Int. Cl.
*B60N 2/28* (2006.01)
*B60N 2/42* (2006.01)

(52) U.S. Cl.
USPC .................... 297/216.11; 297/250.1; 297/254

(58) Field of Classification Search
USPC .................... 297/216.11, 250.1, 254
See application file for complete search history.

(56) References Cited

U.S. PATENT DOCUMENTS

| | | | |
|---|---|---|---|
| 5,294,183 A | | 3/1994 | Wetter |
| 5,449,216 A | * | 9/1995 | Gierman et al. .......... 297/216.11 |
| 5,468,044 A | * | 11/1995 | Coman ..................... 297/216.11 |
| 5,639,144 A | * | 6/1997 | Naujokas ............. 297/216.11 X |
| 5,685,603 A | | 11/1997 | Lane |
| 5,971,489 A | | 10/1999 | Smithson |
| 6,386,632 B1 | * | 5/2002 | Goor et al. ............... 297/216.11 |
| 6,619,752 B1 | | 9/2003 | Glover |
| 6,679,550 B2 | * | 1/2004 | Goor et al. ............... 297/216.11 |
| 6,871,908 B2 | | 3/2005 | Takizawa |
| 7,083,237 B2 | | 8/2006 | Horton |
| 7,467,824 B2 | * | 12/2008 | Nakhla et al. ............ 297/216.11 |
| 7,472,952 B2 | | 1/2009 | Nakhla |
| 7,607,697 B2 | | 10/2009 | Esler |
| 7,699,393 B2 | | 4/2010 | Forbes |
| 8,393,674 B2 | * | 3/2013 | Keegan et al. ........... 297/216.11 |
| 2006/0103200 A1 | | 5/2006 | Dingman |
| 2006/0163923 A1 | * | 7/2006 | Baumann et al. ............. 297/254 |
| 2009/0256404 A1 | | 10/2009 | Strong |
| 2012/0098304 A1 | * | 4/2012 | Gaudreau, Jr. ........... 297/216.11 |
| 2012/0098309 A1 | * | 4/2012 | Gaudreau et al. ...... 297/250.1 X |
| 2012/0306243 A1 | * | 12/2012 | Oltman et al. ........... 297/216.11 |

FOREIGN PATENT DOCUMENTS

WO  2005108155  11/2005

* cited by examiner

*Primary Examiner* — Rodney B White
(74) *Attorney, Agent, or Firm* — Barnes & Thornburg LLP

(57) ABSTRACT

A child restraint in accordance with the present disclosure includes a juvenile seat and a child-restraint harness coupled to the juvenile seat. The child-restraint harness includes a crotch belt. A seat-back tether strap is also included in the child restraint.

32 Claims, 8 Drawing Sheets

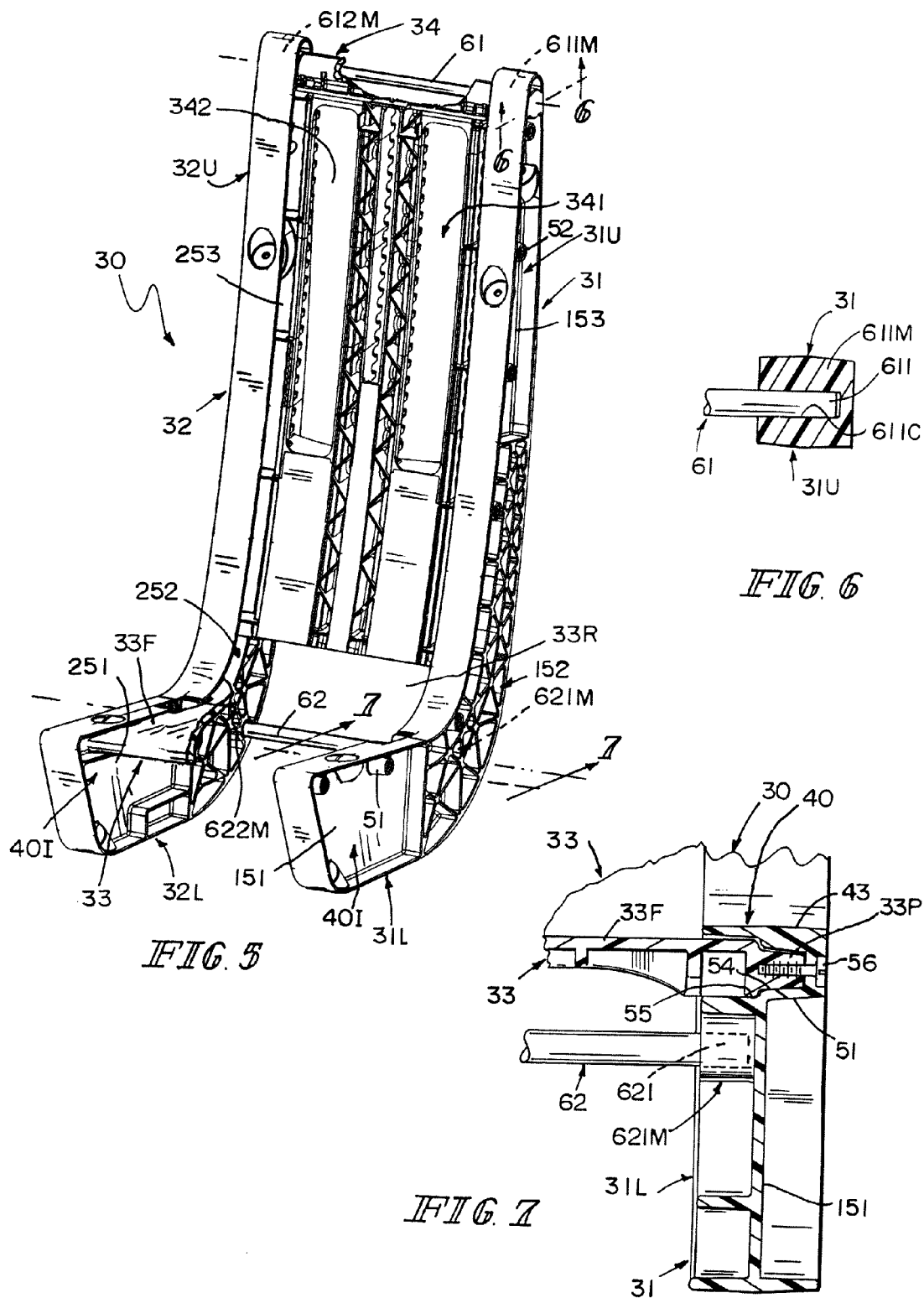

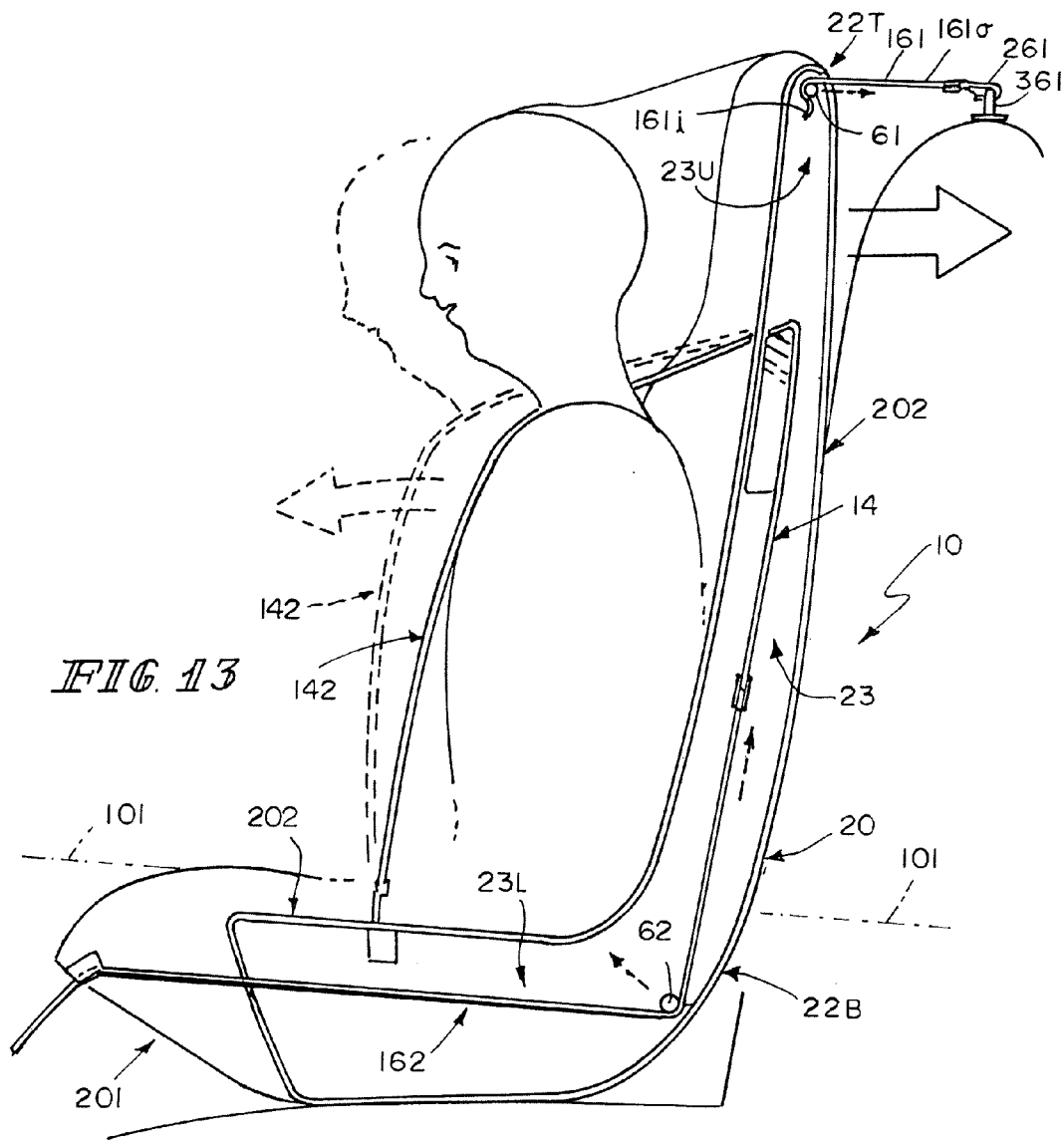
FIG. 13
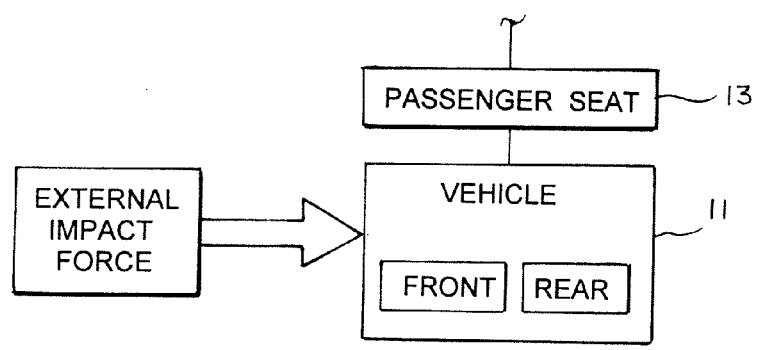

US 8,496,293 B2

ENERGY-DISSIPATION SYSTEM FOR JUVENILE VEHICLE SEAT

PRIORITY

This application claims priority under 35 U.S.C. §119(e) to U.S. Provisional Application Ser. No. 61/422,573, filed Dec. 13, 2010, which is expressly incorporated by reference herein.

BACKGROUND

The present disclosure relates to child restraints, and in particular, to juvenile seats for use on passenger seats in vehicles. More particularly, the present disclosure relates to energy-dissipation structures included in juvenile seats.

SUMMARY

According to the present disclosure, a child restraint includes a juvenile seat for use on a passenger seat in a vehicle and a child-restraint harness coupled to the juvenile seat. The juvenile seat includes a seat shell formed to include a seat bottom and a seat back extending upwardly from the seat bottom.

In illustrative embodiments, the child restraint further includes a rigidifying structure comprising two separate stiffener beams coupled to the seat shell of the juvenile seat. Fasteners are used to couple each stiffener beam to the seat bottom and back of the seat shell so that the stiffener beams are fixed in a stationary uniformly spaced-apart relation to one another. In illustrative embodiments, each stiffener beam is J-shaped to resemble a hockey stick.

In illustrative embodiments, the child restraint also includes an energy-dissipation system located in the interior region of the hollow seat shell and coupled to the rigidifying truss. The energy-dissipation system includes one or both of a top load-limiter bar coupled to upper portions of the first and second stiffener beams and a bottom load-limiter bar coupled to the lower portions of the first and second stiffener beams. The top load-limiter bar is configured to mate with a seat-back tether strap anchored to the vehicle and deform to dissipate energy applied to the juvenile seat during exposure of the vehicle to an external impact force. The bottom load-limiter bar is configured to mate with a crotch belt included in a child-restraint harness provided in the juvenile seat and deform to dissipate energy applied to the juvenile seat during exposure of the vehicle to an external impact force.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 5 is an enlarged view of the rigidifying truss carrying the top and bottom load-limiter bars before it is mounted in the interior region formed in the hollow seat shell;

FIG. 6 is an enlarged sectional view taken along line 6-6 of FIG. 5 showing one end of the top load-limiter bar arranged to extend into a bar-receiving chamber formed in an upper bar mount included in the first stiffener beam;

FIG. 7 is an enlarged sectional view taken along line 7-7 of FIG. 5 showing one end of the bottom load-limiter bar arranged to extend into a bar-receiving chamber formed in a lower bar mount included in the first stiffener beam;

FIG. 13 is a diagrammatic view (taken generally along line 13-13 of FIG. 1) of a child seated in the child restraint of FIGS. 1-3 showing movement of the child from first position (shown in solid) to a second position (shown in phantom) during exposure of a vehicle carrying the child restraint and child to an external impact force and suggesting (1) the middle portion of the top load-limiter bar (coupled to the seat-back tether strap) moves away from the seated child to the right (relative to the rigidifying truss) to dissipate energy and thus reduce the load applied to the seated child and (2) the middle portion of the bottom load-limiter bar (coupled to the crotch belt) moves at an angle toward the pelvis of the seated child (relative to the rigidifying truss) to dissipate energy and thus further reduce the load applied to the seated child.

DETAILED DESCRIPTION

Figures 1, 2:
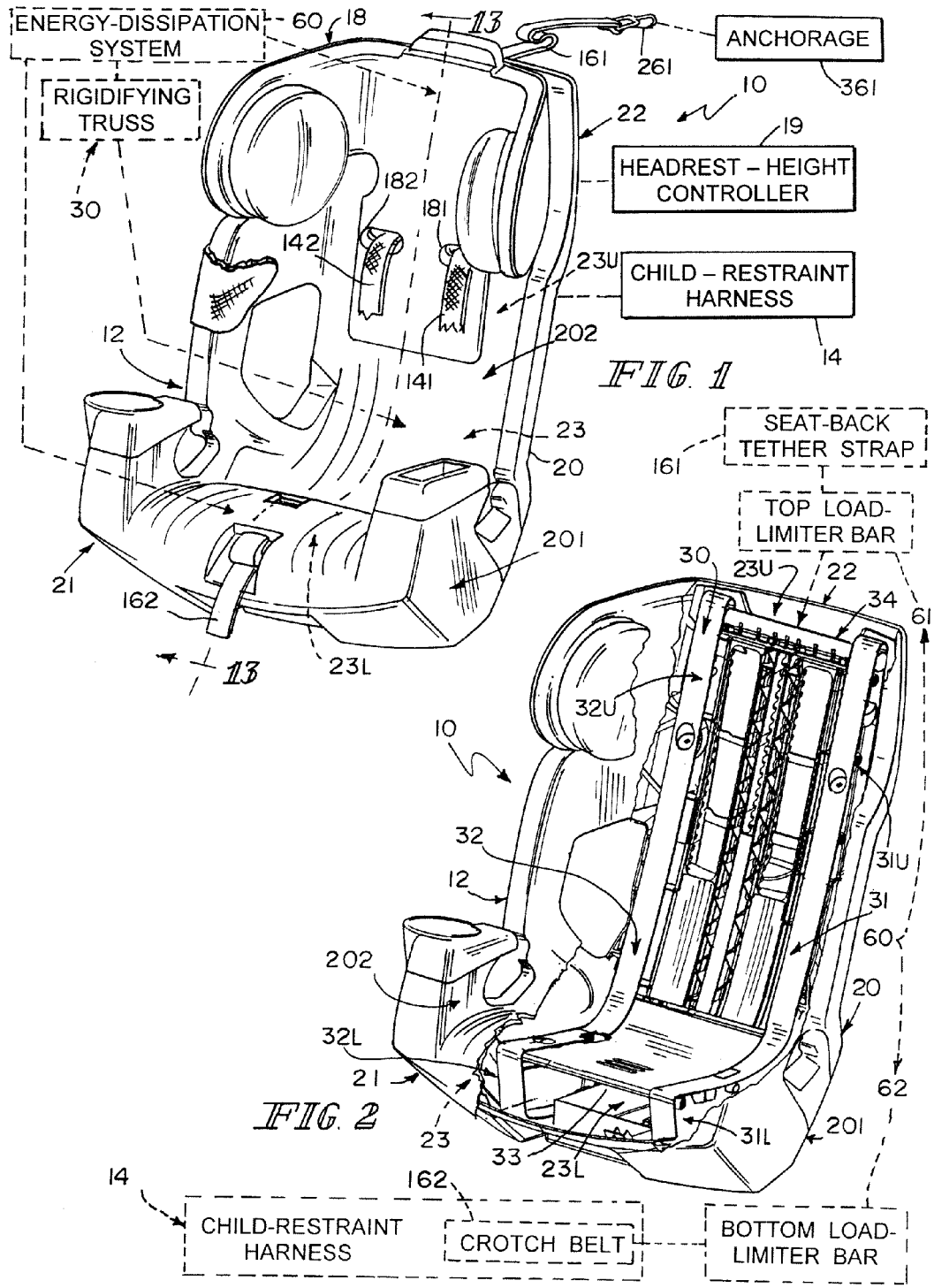
FIG. 1 is a perspective view of a child restraint in accordance with the present disclosure for use on a passenger seat in a vehicle, with portions of a fabric covering broken away, showing a juvenile seat comprising a hollow seat shell including a seat bottom and a seat back extending upwardly from the seat bottom, a rigidifying truss (shown diagrammatically) mounted in an interior region of the hollow seat shell and coupled to the hollow seat shell to rigidify the juvenile seat, and an energy-dissipation system (shown diagrammatically) located in the interior region of the hollow seat shell and coupled to the rigidifying truss.
FIG. 2 is a perspective view similar to FIG. 1 with portions broken away to reveal an illustrative four-part rigidifying truss anchored to the hollow seat shell and configured (as shown in more detail in FIG. 4) to include J-shaped first and second stiffener beams, a lower beam stabilizer arranged to lie in a cavity formed in the seat bottom and extend laterally between lower portions of the first and second stiffener beams, and an upper beam stabilizer arranged to lie in a cavity formed in the seat back and extend laterally between upper portions of the first and second stiffener beams and showing diagrammatically an energy-dissipation system comprising a top load-limiter bar coupled to the rigidifying truss and configured to mate with a seat-back tether strap and change shape to dissipate energy during exposure of a vehicle carrying the juvenile seat to an external impact as suggested in FIGS. 8-10 and a bottom load-limiter bar coupled to the rigidifying truss and configured to mate with a crotch belt included in the child-restraint harness and change shape to dissipate energy during exposure of the vehicle to an external impact as suggested in FIGS. 11-13.
Figure 3:
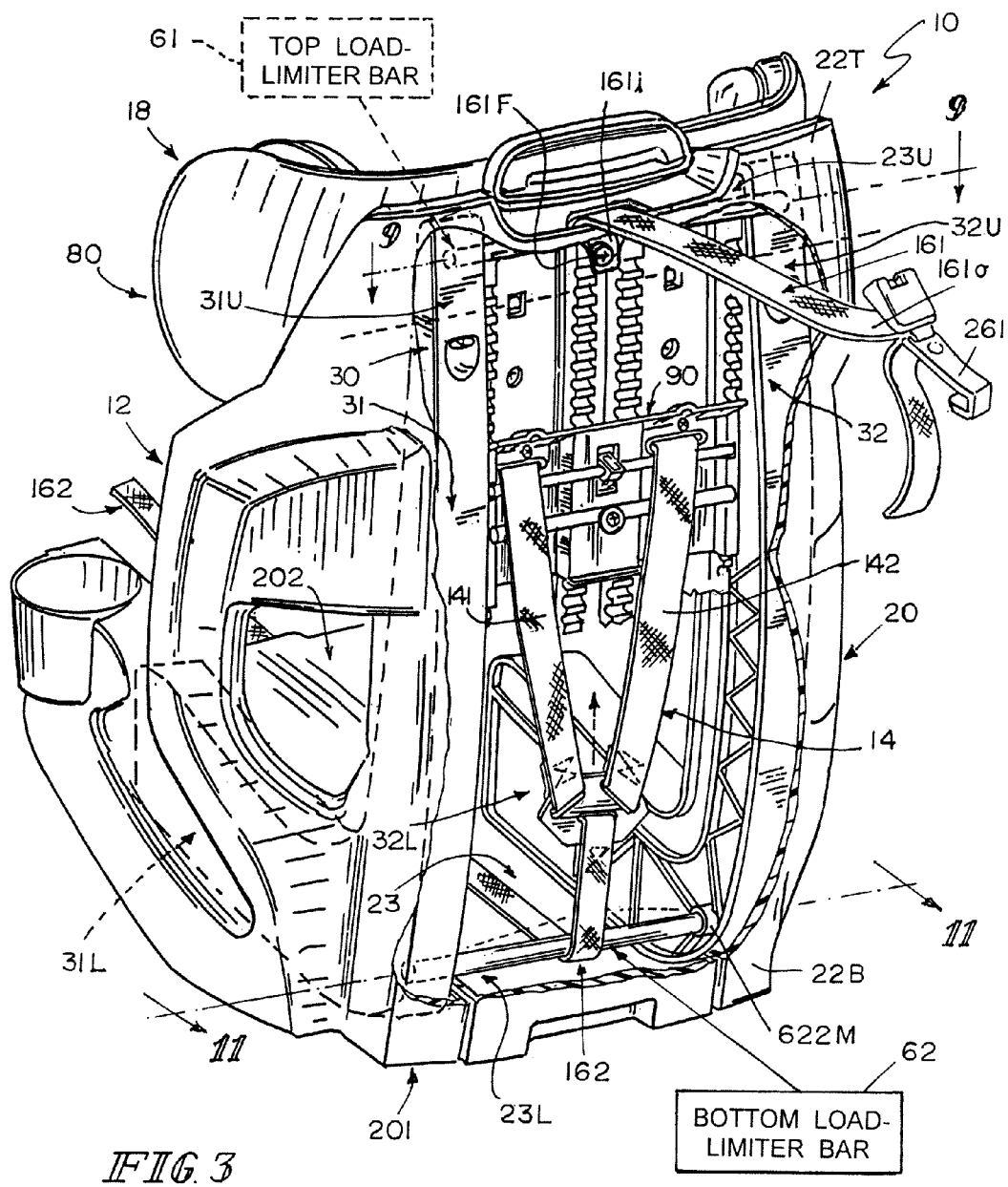
FIG. 3 is an enlarged rear view of the child restraint of FIGS. 1 and 2, with a rear portion of the seat shell removed to show the rigidifying truss mounted in the interior region of the hollow seat shell and showing (1) an illustrative top load-limiter bar arranged to extend laterally between upper portions of first and second stiffener beams included in the rigidifying truss and contact a seat-back tether strap coupled at an inner end thereof to the rigidifying truss and (2) an illustrative bottom load-limiter bar arranged to extend laterally between lower portions of the first and second stiffener beams and contact a portion of a crotch belt included in a child-restraint harness coupled to the juvenile seat.
Figure 10:
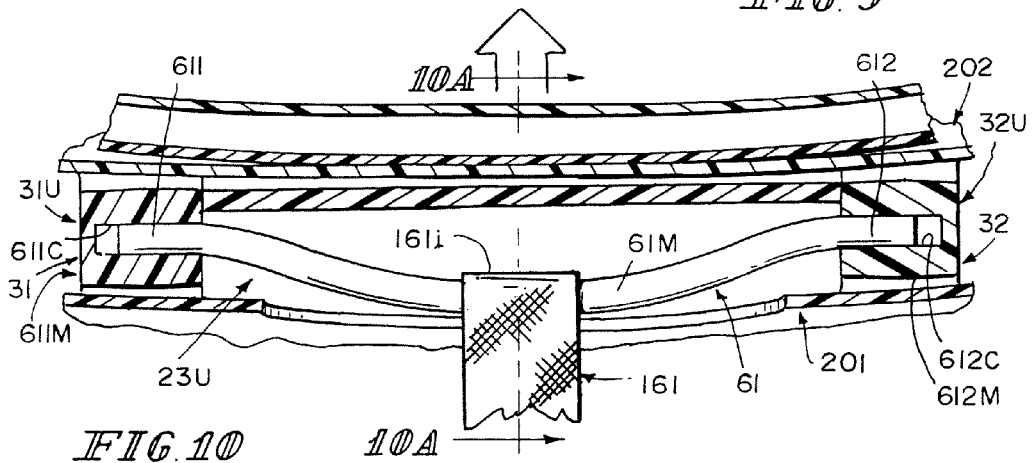
FIG. 10 is a sectional view similar to FIG. 9 showing that the top load-limiter bar has deformed inelastically to assume a new shape in response to a load applied to a middle portion of the top load-limiter bar during exposure of a vehicle carrying the child restraint of FIGS. 1-3 on a passenger seat to an external impact as suggested in FIG. 13 to reduce the load applied to a child seated on the child restraint during such an incident by the child-restraint harness.

An illustrative child restraint 10 comprises a juvenile seat 12, a rigidifying truss 30, and an energy-dissipation system 60 as suggested in FIGS. 1, 3, and 10. In illustrative embodiments, juvenile seat 12 includes a hollow seat shell 20 and rigidifying truss 30 is located inside hollow seat shell 20 as suggested diagrammatically in FIG. 1 and illustratively in FIGS. 2, 3, 7, and 10. Energy-dissipation system 60 is coupled to rigidifying truss 30 as suggested diagrammatically in FIG. 2 and illustratively in FIGS. 3 and 4.

Energy-dissipation system 60 comprises (1) a top load-limiter bar 61 coupled to an upper portion of rigidifying truss 30 and a seat-back tether strap 161 included in a Lower Anchors and Tethers for Children (LATCH) system associated with juvenile seat 12 and (2) a bottom load-limiter bar 62 coupled to a lower portion of rigidifying truss 30 and a crotch belt 162 included in a child-restraint harness 14 associated with juvenile seat 12 as suggested diagrammatically in FIG. 2 and illustratively in FIGS. 3, 5, and 13. Energy that might otherwise be applied by child-restraint harness 14 to a child seated in juvenile seat 12 during exposure of juvenile seat 12 to an external impact force is dissipated by each of top and bottom load-limiter bars 61, 62 as they are deformed and absorb energy applied to top load-limiter bar 61 by seat-back tether strap 161 (as suggested in FIGS. 9 and 10) and to bottom load-limiter bar 62 by crotch belt 162 (as suggested in FIGS. 11 and 12).

Figure 4:
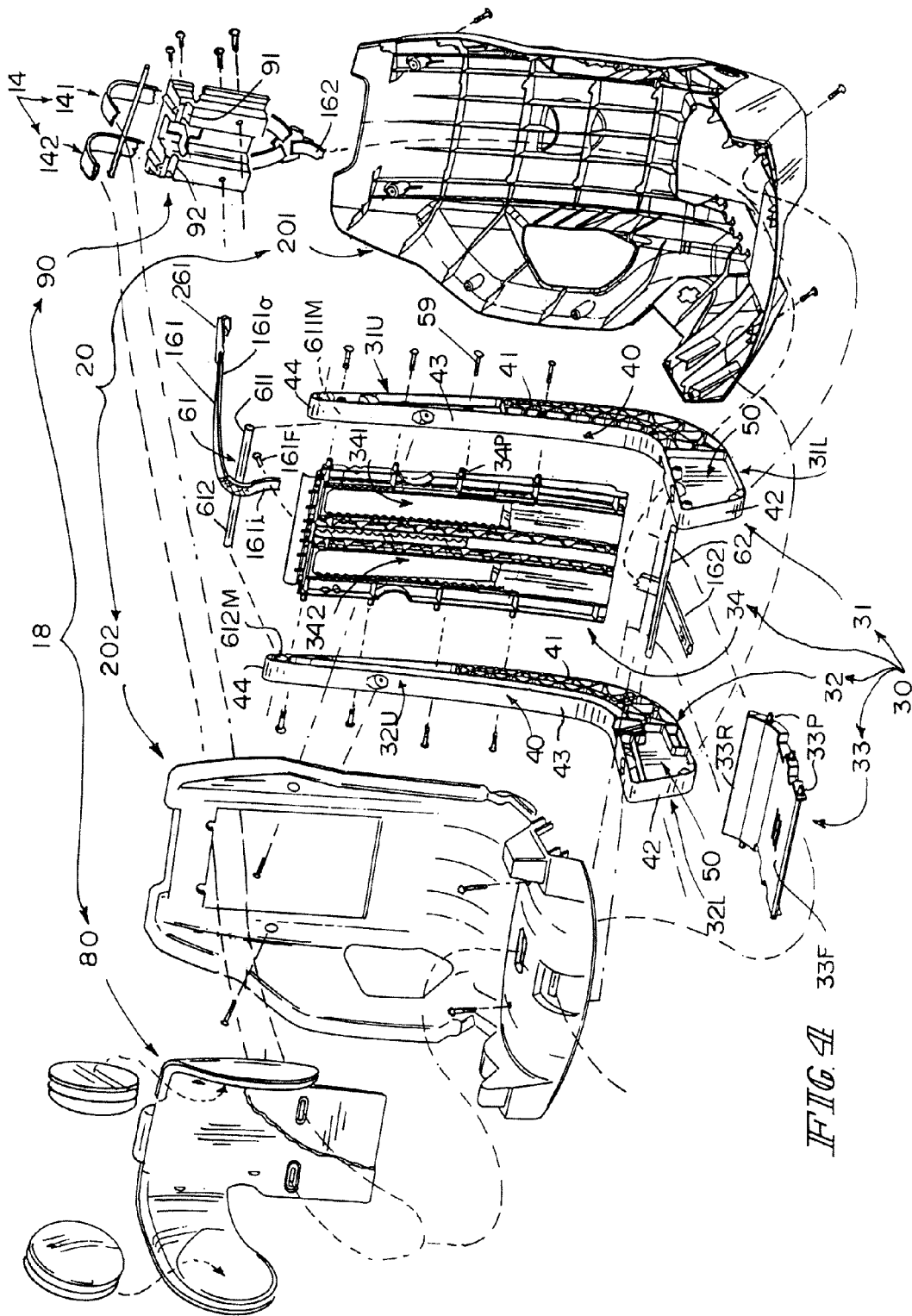
FIG. 4 is an exploded perspective assembly view showing many of the components included in the child restraint of FIGS. 1-3 and showing two 3-shaped first and second stiffener beams that mate with lower and upper beam stabilizers to form the rigidifying truss, the top and bottom load-limiter bars before they are coupled to the first and second stiffener plates, a portion of the upper seat-back tether strap associated with the top load-limiter bar, and a portion of the lower crotch belt associated with the bottom load-limiter bar.

Rigidifying truss 30 includes first and second stiffener beams 31, 32, a lower beam stabilizer 33, and an upper beam stabilizer 34 as suggested in FIGS. 2-4. Lower beam stabilizer 33 is located between and coupled to lower portions 31L, 32L of first and second stiffener beams 31, 32. Upper beam stabilizer 34 is located between and coupled to upper portions 31U, 32U of first and second stiffener beams 31, 32.

In illustrative embodiments, each of top and bottom load-limiter bars 61, 62 is coupled to first and second stiffener beams 31, 32 to cause energy-dissipation system 60 to be mounted on rigidifying truss 30 as suggested in FIGS. 3-5. As suggested in FIGS. 4 and 5, top load-limiter bar 61 is coupled to upper portions 31U, 32U of first and second stiffener beams 31, 32 while bottom load-limiter bar 62 is coupled to lower portions 31L, 32L of first and second stiffener beams 31, 32. In an illustrative embodiment, top and bottom load-limiter bars 61, 62 are arranged to lie in spaced-apart parallel relation to one another as suggested in FIGS. 3, 5, and 13.

Hollow seat shell 20 includes a seat bottom 21 and a seat back 22 extending upwardly from seat bottom 21 as shown, for example, in FIGS. 1 and 2. Seat back 22 cooperates with seat bottom 21 to define an interior region 23 containing rigidifying truss 30 and top and bottom load-limiter bars 61, 62 of energy-dissipation system 60 as suggested in FIGS. 1 and 2. Rigidifying truss 30 is coupled to seat bottom and back 21, 22 as suggested in FIG. 4 to lie in a stationary position in interior region 23 of hollow seat shell 20 as suggested in FIGS. 2 and 3.

Top load-limiter bar 61 of energy-dissipation system 60 is coupled to rigidifying truss 30 and configured to mate with a seat-back tether strap 161 and change shape to dissipate energy during exposure of a vehicle 11 carrying juvenile seat 12 to an external impact as suggested in FIGS. 8-10 and 13. Top load-limiter bar 61 is arranged to extend laterally between upper portions 31U, 32U of first and second stiffener beams 31, 32 included in rigidifying truss 30 and contact seat-back tether strap 161 coupled at an inner end 161*i* thereof to rigidifying truss 30 using, for example, a fastener 161F as shown, for example, in FIGS. 3, 8, 9A, 10A, and 13. A hook 261 is coupled to an outer end 161*o* of seat-back tether strap 161 and configured to mate with an anchorage 361 included in a vehicle 11 behind juvenile seat 12 to allow juvenile seat 12 to be tethered to vehicle 11 as suggested in FIGS. 9A, 10A, and 13.

Figure 11:
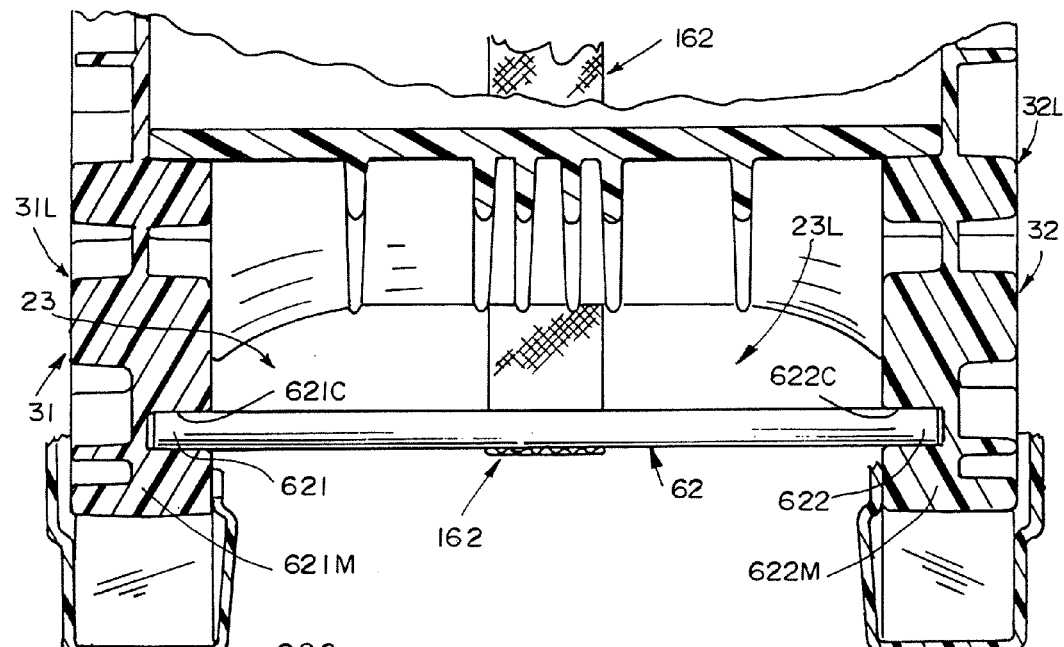
FIG. 11 is a sectional view taken along line 11-11 of FIG. 3 showing an undeformed bottom load-limiter bar coupled to a portion of the crotch belt of the child-restraint harness.
Figure 12:
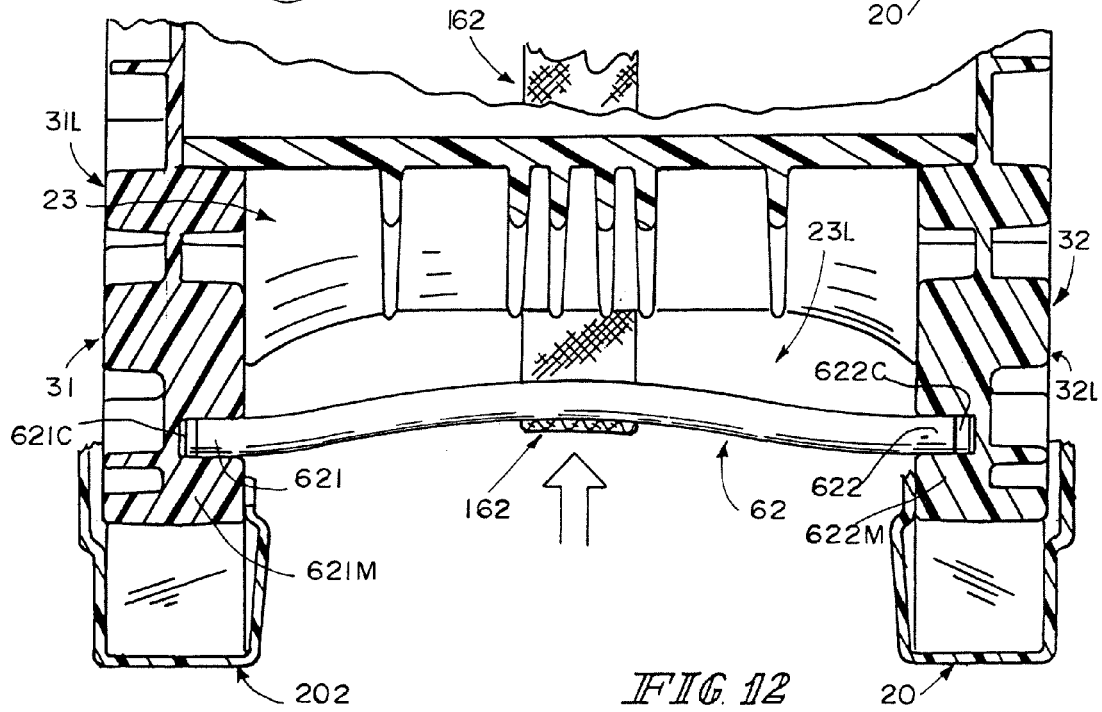
FIG. 12 is a sectional view similar to FIG. 11 showing that the bottom load-limiter bar has deformed inelastically to assume a new shape in response to a load applied to a middle portion of the bottom load-limiter bar during exposure of a vehicle carrying the child restraint of FIGS. 1-3 on a passenger seat to an external impact as suggested in FIG. 13 to reduce the load applied to a child seated in the child restraint during such an incident via the child-restraint harness.

Bottom load-limiter bar 62 of energy-dissipation system 60 is coupled to rigidifying truss 30 and configured to mate with a crotch belt 162 included in child-restraint harness 14 and change shape to dissipate energy during exposure of vehicle 11 to an external impact as suggested in FIGS. 11-13. Bottom load-limiter bar 62 is arranged to extend laterally between lower portions 31U, 32U of first and second stiffener beams 31, 32 and contact a portion of a crotch belt 162 included in a child-restraint harness 14 coupled to juvenile seat 12 as suggested in FIGS. 3, 4, and 11.

Top load-limiter bar 61 is arranged to extend laterally between first and second stiffener beams 31, 32 and lie above upper beam stabilizer 34 as suggested in FIGS. 3 and 4. An inner portion 161*i* of seat-back tether strap 161 is wrapped around a curved top surface of top load-limiter bar 61 as suggested in FIGS. 3, 8, and 9. Top load-limiter bar 61 is shown, for example, in an original undeformed condition in FIGS. 3, 5, 8, 9, and 9A. Top load-limiter bar 61 has deformed inelastically to assume a new shape in response to a load applied to a middle portion of top load-limiter bar 61 by seat-back tether strap 161 during exposure of a vehicle 11 carrying child restraint 10 of FIGS. 1-3 on a passenger seat 13 to an external impact force as suggested in FIG. 13 to reduce the load applied to a child seated on child restraint 10 during such an incident by child-restraint harness 14.

Bottom load-limiter bar 62 is arranged to extend laterally between first and second stiffener beams 31, 32 and lie under lower beam stabilizer 33 as suggested in FIGS. 3 and 4. A portion of crotch belt 162 of child-restraint harness 14 is wrapped around bottom load-limiter bar 62 as suggested in FIGS. 4, 11, and 13. Bottom load-limiter bar 62 is shown, for example, in an original undeformed condition in FIGS. 3, 5, and 11. Bottom load-limiter bar 62 has deformed inelastically to assume a new shape in response to a load applied to a middle portion of bottom load-limiter bar 62 by crotch belt 162 during exposure of a vehicle carrying the child restraint of FIGS. 1-3 on passenger seat 13 to an external impact force as suggested in FIG. 13 to reduce the load applied to a child seated in child restraint 10 during such an incident via child-restraint harness 14 as suggested in FIG. 13.

As suggested in FIG. 13, a seated child moves from first position (shown in solid) to a second position (shown in phantom) during exposure of a vehicle 11 carrying child restraint 10 and child to an external impact force. During such an incident, the middle portion of top load-limiter bar 61 (coupled to seat-back tether strap 161) moves away from the seated child to the right (relative to rigidifying truss 30) to dissipate energy and thus reduce the load applied to the seated child and the middle portion of bottom load-limiter bar 62 (coupled to crotch belt 162) moves at an angle toward the pelvis of the seated child (relative to rigidifying truss 30) to dissipate energy and thus further reduce the load applied to the seated child.

Hollow seat shell 20 includes a bottom shell portion 201 and a top shell portion 202 in illustrative embodiments as suggested in FIGS. 1 and 4. Top shell portion 202 is coupled to bottom shell portion 201 to form interior region 23 therebetween as suggested in FIGS. 1 and 2. A bottom cavity 23L of interior region 23 is formed in seat bottom 21 when bottom and top shell portions 201, 202 are mated. A back cavity 23U of interior region 23 is formed in seat back 22 to communicate with bottom cavity 23L and to provide a space large enough to contain rigidifying truss 30 and top and bottom load-limiter bars 61, 62 of energy-dissipation system 60 therein when bottom and top shell portions 201, 202 are mated as suggested in FIGS. 2, 3, and 13.

Rigidifying truss 30 is a modular component configured to be mounted in interior region 23 of hollow seat shell 20 to rigidify seat shell 20 and is shown, for example, in FIG. 5. First and second stiffener beams 31, 32 are arranged to lie in laterally spaced-apart relation to one another in interior region 23. Lower beam stabilizer 33 is arranged to interconnect lower portions 31L, 32L of first and second stiffener beams 31, 32 to retain those lower portions 31L, 32L in fixed relation to one another. Upper beam stabilizer 34 is arranged to interconnect upper portions 31U, 32U of first and second stiffener beams 31, 32 to retain those upper portions 31U, 32U in fixed relation to one another and to lower portions 31L, 32L of first and second stiffener beams 31, 32. In an illustrative embodiment, each of truss components 31-34 is made of a glass-filled polypropylene material while bottom and top shell portions 201, 202 are made of a polypropylene material.

Once rigidifying truss 30 is placed between bottom and top shell portions 201, 202 and coupled to bottom shell portion 201 and top shell portion 202 is coupled to bottom shell portion 201, then rigidifying truss 30 is retained in interior region 23 of the two-part seat shell 20 to rigidify seat shell 20. As suggested in FIG. 2, lower beam stabilizer 33 is located in bottom cavity 23L of interior region 23 formed in seat bottom 21 and upper beam stabilizer 34 is located in back cavity 23U of interior region 23 formed in seat back 22. As suggested in FIGS. 3 and 13, top load-limiter bar 61 is located in back cavity 23O of interior region 23 and bottom load-limiter bar 62 is located in bottom cavity 23L of interior region 23.

Each of first and second stiffener beams 31, 32 is substantially J-shaped to resemble a hockey stick in an illustrative embodiment as shown, for example, in FIG. 4. Lower portions 31L, 32L of stiffener beams 31, 32 lie in bottom cavity 23L while upper portions 31U, 32U of stiffener beams 31, 32 lie in back cavity 23U as suggested in FIG. 2.

The lower portion 31L, 32L of each of first and second stiffener beams 31, 32 is a forwardly and generally horizontally extending blade having an inwardly facing side edge mating with an outwardly facing edge of lower beam stabilizer 33 in an illustrative embodiment. The upper portion 31U, 32U of each of first and second stiffener beams 31, 32 is an upwardly extending handle coupled to a rear end of a companion blade and arranged to cooperate with the companion blade to define an obtuse included angle therebetween as suggested in FIG. 4.

Each of first and second stiffener beams 31, 32 includes a perimeter flange 40 and a rigidifying structure 50 as suggested in FIGS. 4 and 5. Perimeter flange 40 is formed to include an interior space 401 bounded by perimeter flange 40 as suggested in FIG. 5. Rigidifying structure 50 is located in interior space 401 and coupled to perimeter flange 40.

Each perimeter flange 40 includes a J-shaped topside wall 43 arranged to extend alongside of lower beam stabilizer 33 and upper beam stabilizer 34, a J-shaped underside wall 41 arranged to lie in spaced-apart relation to J-shaped topside wall 43 and a front wall 42 arranged to interconnect forward ends of each of J-shaped topside and underside walls 43, 41 as suggested in FIG. 4. In illustrative embodiments, each perimeter flange 40 also includes a peak wall 44 arranged to interconnect opposite rearward ends of each of J-shaped topside and underside walls 43, 41 as suggested in FIGS. 2 and 4.

Hollow seat shell 20 includes a bottom shell portion 201 and a top shell portion 202 as suggested in FIGS. 1-4. Top shell portion 202 is coupled to bottom shell portion 201 to form bottom and back cavities 23L, 23U of interior region 23 therebetween as suggested in FIG. 2. The J-shaped underside wall 41 of each stiffener beam 31, 32 mates with bottom shell portion 201 to cause rigidifying truss 30 to rigidify bottom shell portion 201. It is within the scope of this disclosure to mount top shell portions of various shapes and configurations on a rigidified foundation comprising bottom shell portion 201 and rigidifying truss 30. It is also within the scope of this disclosure to vary the shape and configuration of bottom shell portion 201 somewhat to match and mate with a selected companion top shell portion. Rigidifying truss 30 can be used to rigidify a wide variety of hollow seat shells in accordance with the present disclosure.

Rigidifying structure 50 of first stiffener beam 31 includes upright first bottom and top plates 151, 153 and a first stiffener-beam internal truss system 152 configured to mate with one end of bottom load-limiter bar 62 in an illustrative embodiment as shown, for example, in FIGS. 5 and 7. Upright first bottom plate 151 is located in bottom cavity 23L in seat bottom 21 and coupled to each of J-shaped topside and underside walls 43, 41 of first stiffener beam 31. Upright first top plate 153 is located in back cavity 23U of seat back 22 and coupled to each of J-shaped topside and underside walls 43, 41 of first stiffener beam 31. First stiffener-beam internal truss system 152 is arranged to interconnect upright first bottom and top plates 151, 153 and extend into bottom and back cavities 23L, 23U formed in hollow seat shell 20 as suggested in FIG. 2.

Rigidifying structure 50 of second stiffener beam 32 likewise includes upright second bottom and top plates 251, 253 and a second stiffener-beam internal truss system 252 in an illustrative embodiment as shown, for example, in FIG. 4. Upright second bottom plate 251 is located in bottom cavity 23L in seat bottom 21 and coupled to each of J-shaped topside and underside walls 43, 41 of second stiffener beam 32. Upright second top plate 253 is located in back cavity 23U of seat back 22 and coupled to each of J-shaped topside and underside walls 43, 41 of second stiffener beam 32. Second stiffener-beam internal truss system 252 is arranged to interconnect upright second top and bottom plates 251, 253 and extend into bottom and back cavities 23L, 23U formed in hollow seat shell 20 as suggested in FIG. 2.

Top load-limiter bar 61 is coupled to rigidifying structure 50 of first and second stiffener beams 31, 32 in a manner shown, for example, in FIGS. 4-6 and 8. A first end 611 of top load-limiter bar 61 is arranged to extend into a bar-receiving chamber 611C formed in an upper bar mount 611M included in upper portion 31U of first stiffener beam 31 as suggested in FIG. 9. A second end 612 of top load-limiter bar 61 is arranged to extend into a bar-receiving chamber 612C formed in an upper bar mount 612M included in upper portion 32U of second stiffener beam 32 as suggested in FIG. 9.

Bottom load-limiter bar 62 is coupled to rigidifying structure 50 of first and second stiffener beams 31, 32 in a manner shown, for example, in FIGS. 4, 5, 7, and 11. A first end 621 of bottom load-limiter bar 62 is arranged to extend into a bar-receiving chamber 621C formed in a lower bar mount 621M included in lower portion 31L of first stiffener beam 31 as suggested in FIG. 11. A second end 622 of bottom load-limiter bar 62 is arranged to extend into a bar-receiving chamber 622C formed in a lower bar mount 622 M included in a lower portion 32L of second stiffener beam 32 as suggested in FIG. 11.

Lower beam stabilizer 33 includes a front panel 33F and a rear panel 33R as shown, for example, in FIGS. 4 and 5. Front panel 33F is arranged to lie in a substantially horizontal plane between upright first and second bottom plates 151, 251 of first and second stiffener beams 31, 32 as suggested in FIG. 5. Rear panel 33R is appended to front panel 33F and arranged to extend upwardly from front panel 33F in a direction toward upper beam stabilizer 34 and to lie between first and second stiffener-beam internal truss systems 152, 252 as also suggested in FIG. 5.

Rear panel 33R of lower beam stabilizer 33 is curved and formed to include a concave surface arranged to face toward a child seated on seat bottom 21 of juvenile seat 12. Rear panel 33R of lower beam stabilizer 33 terminates at a rear edge that is arranged to extend between first and second stiffener beams 31, 32 as suggested in FIG. 4. Upper beam stabilizer 34 includes a lower edge that is arranged to extend between first and second stiffener beams 31, 32 and mate with the rear edge of rear panel 33R of lower beam stabilizer 33 as suggested in FIG. 5.

Upper beam stabilizer 34 includes an upper panel 34U and a lower panel 34L as shown for example in FIGS. 4 and 5. Upper panel 34U is formed to include a pair of upwardly extending and laterally spaced-apart belt-travel channels 341, 342 as shown, for example, in FIGS. 2, 4, and 5. Upper panel 34U is arranged to lie between upright first and second top plates 153, 253 of first and second stiffener beams 31, 32 as suggested in FIG. 5. Lower panel 34L is arranged to extend downwardly from upper panel 34U toward lower beam stabilizer 33. Lower panel 34L is arranged to lie between first and second stiffener-beam internal truss systems 152, 252. Each of the belt-travel channels 341, 342 is configured to provide means for receiving therein a shoulder belt 141, 142 included in a child-restraint harness 14 coupled to juvenile seat 12 as suggested in FIGS. 3 and 13.

Rigidifying structure 50 of first stiffener beam 31 further includes a lower pin mount 51 formed to include a pin-receiving chamber 54 as suggested in FIGS. 5 and 7. Lower pin mount 51 is coupled to upright first bottom plate 151 at an aperture 55 formed in upright first bottom plate 151 to provide an opening into pin-receiving chamber 54 as suggested in FIG. 7.

Lower beam stabilizer 33 includes a front panel 33F and several spaced-apart lower panel-support pins 33P as suggested in FIGS. 4 and 7. Front panel 33F is arranged to lie in a substantially horizontal plane between first and second stiffener beams 31, 32. Each lower panel-support pin 33P is coupled to front panel 33F and arranged to extend outwardly away from front panel 33F through the opening and into pin-receiving chamber 54 of a companion of lower pin mount 51 as suggested in FIG. 7. Lower beam stabilizer 33 further includes a lower fastener 56 coupled to lower pin mount 51 and to lower panel-support pin 33P to anchor lower beam stabilizer 33 to rigidifying structure 50 of first stiffener beam 31.

Rigidifying structure 50 of first stiffener beam 31 further includes an upper pin mount 52 formed to include a pin-receiving chamber. Upper pin mount 52 is coupled to upright second top plate 152 at an aperture formed in upright first top plate 152 to provide an opening into pin-receiving chamber of upper pin mount 52.

Upper beam stabilizer 34 includes an upper panel 34U and second upper panel-support pins 34P. Upper panel 34U is arranged to lie between first and second stiffener beams 31, 32. Each upper panel-support pin 34P is coupled to upper panel 34U and arranged to extend outwardly away from upper panel 34U through the opening and into a pin-receiving chamber of a companion upper pin mount 52. Upper beam stabilizer 34 further includes an upper fastener 59 coupled to upper pin mount 52 and to upper panel-support pin 34P to anchor upper beam stabilizer 34 to rigidifying structure 30 of first stiffener beam 31.

Second stiffener beam 32 is similar to first stiffener beam 31 as suggested in FIGS. 4 and 5. Lower portion 32L of second stiffener beam 32 includes a lower pin mount 51 formed to include a pin-receiving chamber 54. Upper portion 32U of second stiffener beam 32 includes an upper pin mount 52 formed to include a pin-receiving chamber.

Juvenile seat 12 further includes an adjustable headrest 18 mounted for up-and-down movement on seat back 22 above seat bottom 21 and a headrest-height controller 19 configured and arranged to adjust the height of headrest 18 above seat bottom 21. Headrest-height controller 119 is configured to provide means for controlling the height of headrest 18 on seat back 22 relative to seat bottom 21.

As suggested in FIGS. 1, 3, and 4, headrest 18 includes a head cradle 80 and a slidable cradle-retainer plate 90. Cradle-retainer plate 90 is coupled to head cradle 80 to move therewith relative to seat back 22 and to retain head cradle 80 in tethered relation to seat back 22 while allowing up-and-down movement of head cradle 80 relative to seat back 22.

Upper panel 34U of upper beam stiffener 34 is formed to include a pair of upwardly extending and laterally spaced-apart belt-travel channels 341, 342 shown, for example, in FIGS. 2, 4, and 5. These belt-travel channels 341, 342 are provided so that shoulder belts 141, 142 in child-restraint harness 14 can pass between front and rear sides of seat shell 20. Headrest 18 is aligned with seat back 22 so that belt-receiving slots 181, 182 formed in head cradle 80 and belt-receiving slots 91, 92 formed in slidable cradle-retainer plate 90 of headrest 18 are always aligned with belt-travel channels 341, 342 formed in upper panel 34U of upper beam stabilizer 34 regardless of the position of headrest 18 on seat back 22. Backrest 202U of top shell portion 202 is formed to include an aperture 202A aligned to communicate with belt-travel channel 341, 342 as suggested in FIGS. 2 and 4.

A first shoulder belt 141 included in child-restraint harness 14 is arranged to extend through first belt-travel channel 341 as suggested in FIGS. 1 and 2. First shoulder belt 141 is also arranged to extend through a first shoulder belt-receiving slot 181 formed in head cradle 80 of headrest 18 as suggested in FIG. 3 and through a first shoulder belt-receiving slot 91 formed in slidable cradle-retainer plate 90 of headrest 18 as suggested in FIG. 3.

A second shoulder belt 142 included in child-restraint harness 14 is arranged to extend through second belt-travel channel 342 as suggested in FIGS. 1 and 2. Second shoulder belt 142 is also arranged to extend through a second shoulder belt-receiving slot 182 formed in head cradle 80 of headrest 18 as suggested in FIG. 1 and through a second shoulder belt-receiving slot 92 formed in slidable cradle-retainer plate 90 of headrest 18 as suggested in FIG. 3.

Headrest 18 is mounted for up-and-down movement on seat back 22 of seat shell 20. The first and second shoulder belt-receiving slots 181, 182 of harness-control unit 83 of head cradle 80 and first and second shoulder belt-receiving slots 91, 92 formed in slidable cradle-retainer plate 90 are aligned with their companion belt-travel channels formed in upper beam stiffener 34 of rigidifying truss 30. Shoulder belt-receiving slots 181, 182 formed in head cradle 80 and shoulder belt-receiving slots 91, 92 formed in slidable cradle-retainer plate 90 operate to keep shoulder belts 141, 142 positioned at an appropriate height that corresponds to the vertical position of headrest 18 relative to seat back 22.

Child-restraint harness 14 is used to restrain a child sitting on seat shell 20. Child-restraint harness 14 in an illustrative embodiment is configured to include shoulder belts 141, 142, a crotch belt 143, and thigh belts (not shown). Belt-travel channels 431, 432 formed in rigidifying truss 30 allow shoulder belts 141, 142 to move with headrest 18 along the length of seat back 22 between raised and lowered positions.

Headrest-height controller 19 is included in juvenile seat 12 and is shown diagrammatically in FIG. 1. Headrest-height controller 19 is configured and arranged to vary the height of headrest 18 above seat bottom 21.

Child restraint 10 includes a juvenile seat 12, a rigidifying truss 30, and an energy-dissipation system 60. Juvenile seat includes a seat bottom and a seat back extending upwardly from the seat bottom. Rigidifying truss is coupled to the juvenile seat to lie in a stationary position relative to the seat back.

Energy-dissipation system 60 including a top load-limiter bar 61 coupled to an upper portion of rigidifying truss 30 and a seat-back tether strap 161 as suggested in FIG. 2 and shown in FIG. 3. Top load-limiter bar 61 is made of a deformable shape-changeable material to assume an initial shape. The initial shape of top load-limiter bar 61 is straight in an illustrative embodiment as shown in FIGS. 3 and 4.

Seat-back tether strap 161 is coupled to juvenile seat 12 and adapted to be coupled to an anchorage 361 located in a rear shelf area of a passenger vehicle to tether juvenile seat 12 to the vehicle as shown in FIG. 13. Seat-back tether strap 161 is wrapped around a portion of top load-limiter bar 61 while seat-back tether strap 161 is coupled at one end to juvenile seat 12 and at another end to anchorage 100 to provide means for deforming top load-limiter bar 61 to dissipate energy and change shape inelastically from the initial shape to a deformed shape in response to a bar-deforming load applied to top load-limiter bar 61 by seat-back tether strap 161 during exposure of a passenger vehicle carrying juvenile seat 12 to an external impact force so that transfer of energy from the vehicle carrying juvenile seat 12 to seat bottom and back 21, 22 of juvenile seat 12 is minimized owing to dissipation of energy during deformation of top-load limiter bar 61 as suggested in FIGS. 9 and 10 and in FIGS. 9A and 10A and in FIG. 13.

Energy-dissipation system 60 further includes a bottom load-limiter bar 62 coupled to a lower portion of rigidifying truss 30 and a child-restraint harness 14 coupled to juvenile seat 12 and formed to include a crotch belt 162 as suggested in FIG. 2 and shown in FIG. 3. Bottom load-limiter bar 62 is made of a deformable shape-changeable material to assume an initial shape. The initial shape of the bottom load-limiter bar is straight in an illustrative embodiment as shown in FIGS. 3 and 4.

Crotch belt 162 is wrapped around a portion of bottom load-limiter bar 62 to provide means for deforming bottom load-limiter bar 62 to dissipate energy and change shape inelastically from the initial shape to a deformed shape in response to a bar-deforming load applied to bottom load-limiter bar 62 by crotch belt 162 during movement of a child seated on seat bottom 21 and restrained by child-restraint harness 14 to tension shoulder belts 141, 142 and crotch belt 162 included in child-restraint harness 14 following a sudden stop of a moving passenger vehicle carrying juvenile seat 12 as suggested in FIGS. 12 and 13.

Rigidifying truss 30 includes a first stiffener beam 31 and a second stiffener beam 32 arranged to lie in spaced-apart relation to first stiffener beam 31 as shown in FIGS. 4 and 5. Top load-limiter bar 61 is arranged to extend laterally between and is coupled to each of first and second stiffener beams 31, 32. Bottom load-limiter bar 62 is arranged to extend laterally between and is coupled to each of first and second stiffener beams 31, 32 and arranged to lie in spaced-apart relation to top load-limiter bar 61.

Seat back 22 includes a bottom portion 22B arranged to lie in closely confronting relation to seat bottom 21 and a distal top portion 22T arranged to lie above and in spaced-apart relation to bottom portion 22B as shown in FIGS. 3 and 13. Bottom load-limiter bar 61 is arranged to lie in close proximity to seat bottom 21 and bottom portion 22B of seat back 22. Top load-limiter bar 62 is arranged to lie in close proximity to top portion 22T of seat back 22.

Figure 8:
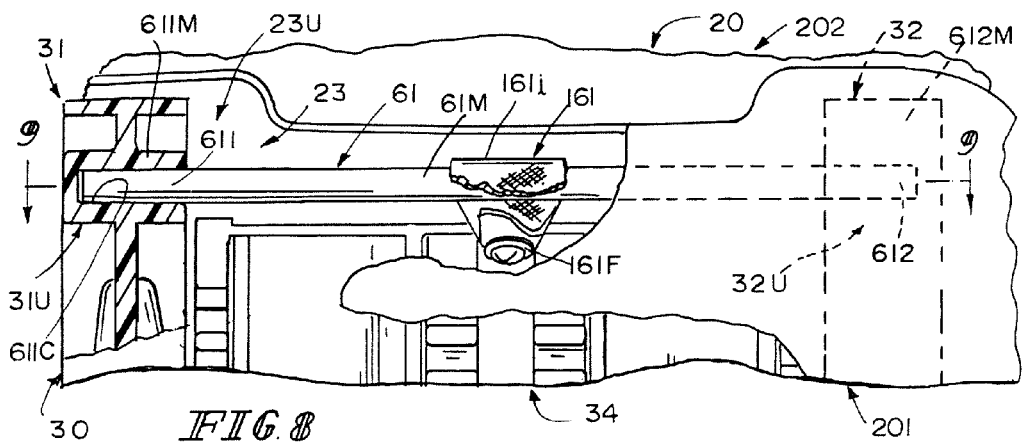
FIG. 8 is an enlarged rear elevation view of a portion of the child restraint of FIGS. 1-3, with portions broken away, showing that the top load-limiter bar is arranged to extend laterally between the first and second stiffener beams and lie above the upper beam stabilizer and showing that the inner portion of the seat-back tether strap is wrapped around a curved top surface of the top load-limiter bar.
Figure 9:
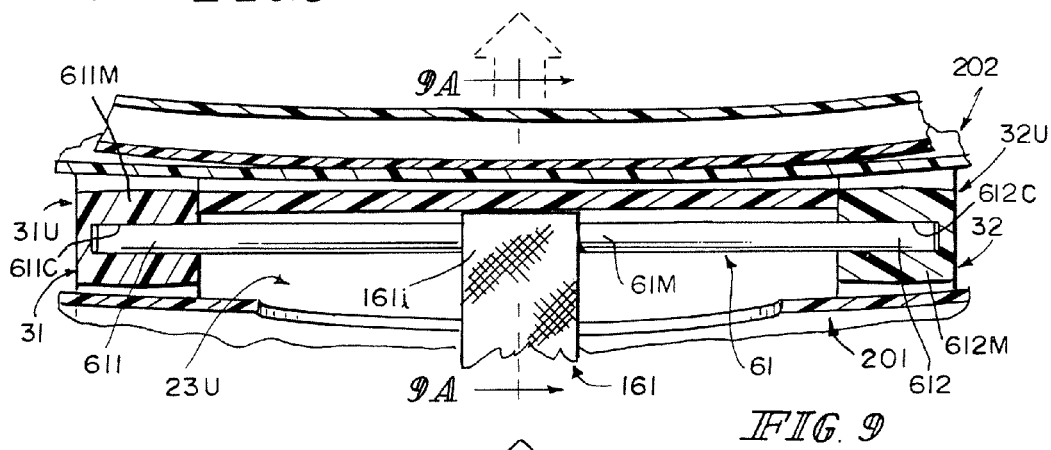
FIG. 9 is a sectional view taken along line 9-9 of FIGS. 3 and 8 showing an undeformed top load-limiter bar coupled to a portion of the seat-back tether strap.
Figure 9A:
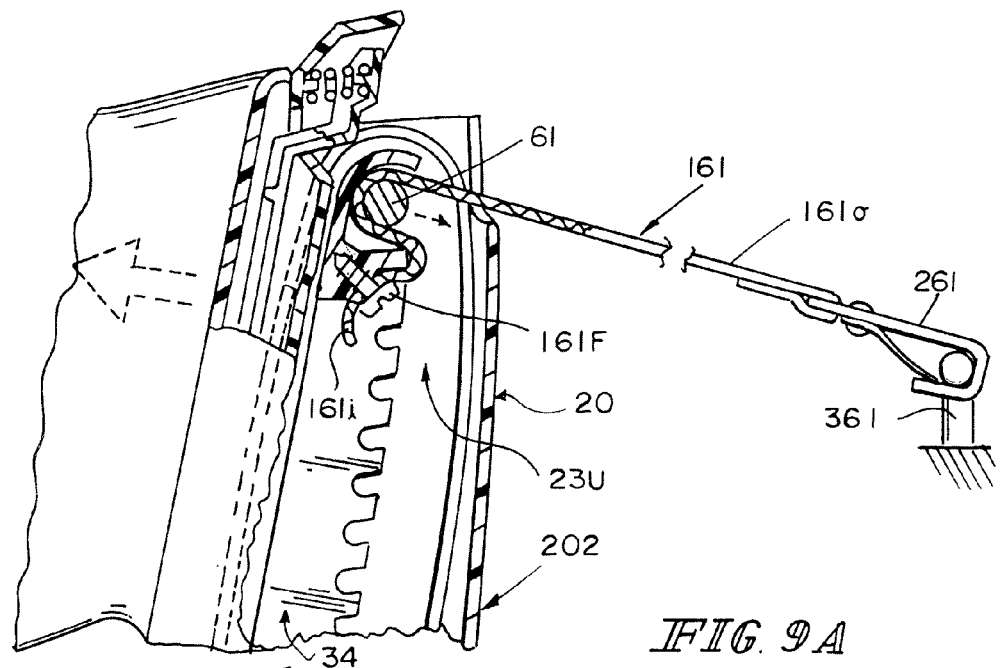
FIG. 9A is a sectional view taken along line 9A-9A of FIG. 9 showing a portion of the child restraint before the top load-limiter bar is deformed.
Figure 10A:
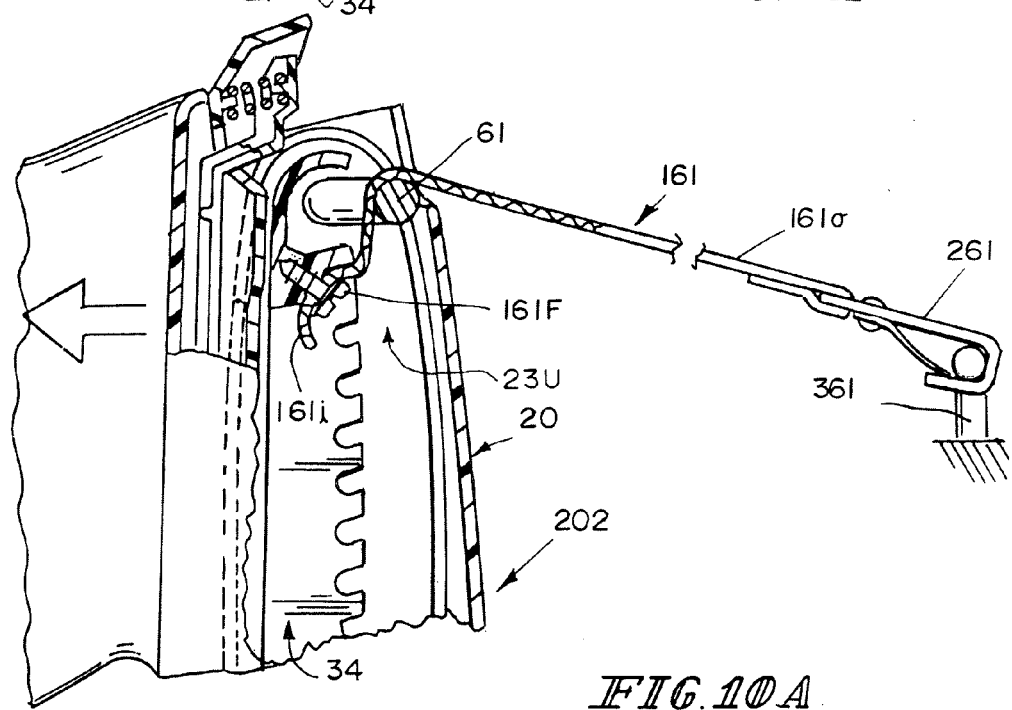
FIG. 10A is a sectional view taken along line 10A-10A of FIG. 10 showing a portion of the child restraint after the top load-limiter bar has been deformed to assume the shape shown in FIG. 10.

Top load-limiter bar 61 has a first end 611 coupled to first stiffener beam 31, an opposite second end 612 coupled to second stiffener beam 32, and a middle portion 61M arranged to extend between first and second ends 611, 612 of top load-limiter bar 61 as shown in FIGS. 8-10. Middle portion 61M is arranged to mate with seat-back tether strap 161 to cause top load-limiter bar 61 to deform inelastically to assume a new shape as suggested in FIGS. 10 and 10A in response to a load applied to middle portion 61M of top load-limiter bar 61 by seat-back tether strap 161 during exposure of a vehicle carrying juvenile seat 12 to an external impact force to reduce a load applied to a child seated on seat bottom 21 during such exposure by child-restraint harness 14. Middle portion 62M is round in an illustrative embodiment.

Top load-limiter bar 61 includes a first end 611 arranged to extend into a bar-receiving chamber 611C formed in upper bar mount 611M of upper portion 31U of first stiffener beam

31, an opposite second end 612 arranged to extend into a bar-receiving chamber 612C formed in upper bar mount 612M of upper portion 32U of second stiffener beam 32, and a middle portion 61M arranged to interconnect first and second ends 611, 612 as shown in FIG. 8. Middle portion 61M is coupled to seat-back tether strap 161 to move therewith relative to first and second stiffener beams 31, 32 to cause movement of first and second ends 611, 612 of top load-limiter bar 61 in companion bar-receiving chambers 611C, 612C during deformation of top load-limiter bar 61 to change shape from the initial shape to the deformed shape as shown in FIG. 10.

Bottom load-limiter bar 62 has a first end 621 coupled to first stiffener beam 31, an opposite second end 622 coupled to second stiffener beam 32, and a middle portion 62M as shown in FIGS. 11 and 12. Middle portion 62M is arranged to extend between first and second ends 621, 622 of bottom load-limiter bar 62 and to mate with crotch belt 162 to cause bottom load-limiter bar 62 to deform inelastically to assume a new shape as suggested in FIG. 12 in response to a load applied to middle portion 62M of bottom load-limiter bar 62 by crotch belt 62 during exposure of a vehicle carrying juvenile seat 12 to an external impact force to reduce a load applied to a child seated on seat bottom 21 during such exposure by child-restraint harness 14. Middle portion 62M is round in an illustrative embodiment.

Bottom load-limiter bar 62 includes a first end 621 arranged to extend into a bar-receiving chamber 621C formed in a central portion 621M of first stiffener beam 31, an opposite second end 622 arranged to extend into a bar-receiving chamber 622C formed in a central portion 622M of second stiffener beam 32, and a middle portion 62M arranged to interconnect first and second ends 621, 622 as shown in FIGS. 11 and 12. Middle portion 62M is coupled to crotch belt 162 to move therewith relative to first and second stiffener beams 31, 32 to cause movement of first and second ends 621, 622 of bottom load-limiter bar 62 in companion bar-receiving chambers 621C, 622C toward one another during deformation of bottom load-limiter bar 62 to change from the initial shape to the deformed shape as shown in FIG. 12.

Each of first and second stiffener beams 31, 32 is J-shaped and includes a short lower portion arranged to lie under seat bottom 21, a relatively longer upper portion arranged to lie behind seat back 22, and a central portion 621M or 622M arranged to interconnect the short lower and relatively longer upper portions. Bottom load-limiter bar 62 is coupled to the central portions of each of first and second stiffener beams 31, 32. Top load-limiter bar is coupled to distal ends of each of the relatively longer upper portions of each of first and second stiffener beams 31, 32.

Seat bottom 21 and seat back 22 cooperate to define a hollow seat shell 20 having an interior region 23 containing rigidifying truss 30 and top and bottom load-limiter bars 61, 62 as suggested in FIGS. 3 and 13. Rigidifying truss 30 includes a first stiffener beam 31 on a first side of hollow seat shell 20 and a second stiffener beam 32 on an opposite second side of hollow seat shell 32 as shown in FIG. 3. Seat bottom 21 includes an exterior surface adapted to support a child sitting on seat bottom 21 and arranged to lie in a reference plane 101 bifurcating each of first and second stiffener beams 31, 32 into a lower beam portion lying below reference plane 101 and an upper beam portion lying above reference plane 101 as suggested in FIG. 13. Top load-limiter bar 61 is coupled to upper beam portions of each of first and second stiffener beams 31, 32. Bottom load-limiter bar 62 is coupled to lower beam portions of each of first and second stiffener beams 31, 32. Bottom load-limiter bar 61 is arranged to lie in a position not located under the exterior surface of seat bottom 21.

Seat bottom 21 includes a hollow bottom shell portion 201 as shown in FIG. 13. Seat back 22 includes a hollow top shell portion 202 that cooperates with bottom shell portion 201 to form interior region 23 as shown in FIG. 13. Top load-limiter bar 61 is located in hollow top shell portion 202 of seat back 22. Bottom load-limiter bar 62 is located in hollow bottom shell portion 201 of seat bottom 21.

Rigidifying truss 30 further includes upper and lower beam stabilizers 24, 33 as shown in FIG. 4. Upper beam stabilizer 34 is arranged to interconnect upper portions of first and second stiffener beams 31, 32 and lie in a portion of interior region 23 formed in seat back 22 and between top and bottom load-limiter bars 61, 62. Lower beam stabilizer 33 is arranged to interconnect lower portions of first and second stiffener beams 31, 32 and lie in a portion of interior region 23 formed in seat bottom 21.

The invention claimed is:

1. A child restraint comprising
a juvenile seat including a seat bottom and a seat back extending upwardly from the seat bottom,
a rigidifying truss coupled to the juvenile seat to lie in a stationary position relative to the seat back, and
an energy-dissipation system including a top load-limiter bar coupled to an upper portion of the rigidifying truss and made of a deformable shape-changeable material to assume an initial shape and a seat-back tether strap coupled to the juvenile seat and adapted to be coupled to an anchorage located in a rear shelf area of a passenger vehicle to tether the juvenile seat to the vehicle, wherein the seat-back tether strap is wrapped around a portion of the top load-limiter bar while the seat-back tether strap is coupled at one end to the juvenile seat and at another end to the anchorage to provide means for deforming the top load-limiter bar to dissipate energy and change shape inelastically from the initial shape to a deformed shape in response to a bar-deforming load applied to the top load-limiter bar by the seat-back tether strap during exposure of a passenger vehicle carrying the juvenile seat to an external impact force so that transfer of energy from the vehicle carrying the juvenile seat to the seat bottom and back of the juvenile seat is minimized owing to dissipation of energy during deformation of the top-load limiter bar.

2. The child restraint of claim 1, wherein the energy-dissipation system further includes a bottom load-limiter bar coupled to a lower portion of the rigidifying truss and made of a deformable shape-changeable material to assume an initial shape and a child-restraint harness coupled to the juvenile seat and formed to include a crotch belt wrapped around a portion of the bottom load-limiter bar to provide means for deforming the bottom load-limiter bar to dissipate energy and change shape inelastically from the initial shape to a deformed shape in response to a bar-deforming load applied to the bottom load-limiter bar by the crotch belt during movement of a child seated on the seat bottom and restrained by the child-restraint harness to tension shoulder belts and the crotch belt included in the child-restraint harness following a sudden stop of a moving passenger vehicle carrying the juvenile seat.

3. The child restraint of claim 2, wherein the rigidifying truss includes a first stiffener beam and a second stiffener beam arranged to lie in spaced-apart relation to the first stiffener beam, the top load-limiter bar is arranged to extend laterally between and is coupled to each of the first and second stiffener beams, and the bottom load-limiter bar is arranged to extend laterally between and is coupled to each of the first and second stiffener beams and arranged to lie in spaced-apart relation to the top load-limiter bar.

4. The child restraint of claim 3, wherein the seat back includes a bottom portion arranged to lie in closely confronting relation to the seat bottom and a distal top portion arranged to lie above and in spaced-apart relation to the bottom portion, the bottom load-limiter bar is arranged to lie in close proximity to the seat bottom and the bottom portion of the seat back, and the top load-limiter bar is arranged to lie in close proximity to the top portion of the seat back.

5. The child restraint of claim 3, wherein the top load-limiter bar has a first end coupled to the first stiffener beam, an opposite second end coupled to the second stiffener beam, and a middle portion arranged to extend between the first and second ends of the top load-limiter bar and to mate with the seat-back tether strap to cause the top load-limiter bar to deform inelastically to assume a new shape in response to a load applied to the middle portion of the top load-limiter bar by the seat-back tether strap during exposure of a vehicle carrying the juvenile seat to an external impact force to reduce a load applied to a child seated on the seat bottom during such exposure by the child-restraint harness and wherein the bottom load-limiter bar has a first end coupled to the first stiffener beam, an opposite second end coupled to the second stiffener beam, and a middle portion arranged to extend between the first and second ends of the bottom load-limiter bar and to mate with the crotch belt to cause the bottom load-limiter bar to deform inelastically to assume a new shape in response to a load applied to the middle portion of the bottom load-limiter bar by the crotch belt during exposure of a vehicle carrying the juvenile seat to an external impact force to reduce a load applied to a child seated on the seat bottom during such exposure by the child-restraint harness.

6. The child restraint of claim 5, wherein the middle portion of each of the top and bottom load-limiter bars is round.

7. The child restraint of claim 5, wherein the initial shape of each of the top and bottom load-limiter bars is straight.

8. The child restraint of claim 3, wherein each of first and second stiffener beams is J-shaped and includes a short lower portion arranged to lie under the seat bottom, a relatively longer upper portion arranged to lie behind the seat back, and a central portion arranged to interconnect the short lower and relatively longer upper portions, the bottom load-limiter bar is coupled to the central portions of each of the first and second stiffener beams, and the top load-limiter bar is coupled to distal ends of each of the relatively longer upper portions of each of the first and second stiffener beams.

9. The child restraint of claim 8, wherein the bottom load-limiter bar includes a first end arranged to extend into a bar-receiving chamber formed in the central portion of the first stiffener beam, an opposite second end arranged to extend into a bar-receiving chamber formed in the central portion of the second stiffener beam, and a middle portion coupled to the crotch belt to move therewith relative to the first and second stiffener beams to cause movement of the first and second ends of the bottom load-limiter bar in companion bar-receiving chambers toward one another during deformation of the bottom load-limiter bar to change from the initial shape to the deformed shape and wherein the top load-limiter bar includes a first end arranged to extend into a bar-receiving chamber formed in the upper portion of the first stiffener beam, an opposite second end arranged to extend into a bar-receiving chamber formed in the upper portion of the second stiffener beam, and a middle portion coupled to the seat-back tether strap to move therewith relative to the first and second stiffener beams to cause movement of the first and second ends of the top load-limiter bar in companion bar-receiving chambers during deformation of the top load-limiter bar to change shape from the initial shape to the deformed shape.

10. The child restraint of claim 2, wherein the seat bottom and seat back cooperate to define a hollow seat shell having an interior region containing the rigidifying truss and the top and bottom load-limiter bars.

11. The child restraint of claim 10, wherein the rigidifying truss includes a first stiffener beam on a first side of the hollow seat shell and a second stiffener beam on an opposite second side of the hollow seat shell, the seat bottom includes an exterior surface adapted to support a child sitting on the seat bottom and arranged to lie in a reference plane bifurcating each of the first and second stiffener beams into a lower beam portion lying below the reference plane and an upper beam portion lying above the reference plane, the top load-limiter bar is coupled to upper beam portions of each of the first and second stiffener beams, an the bottom load-limiter bar is coupled to lower beam portions of each of the first and second stiffener beams.

12. The child restraint of claim 11, wherein the bottom load-limiter bar is arranged to lie in a position not located under the exterior surface of the seat bottom.

13. The child restraint of claim 11, wherein the seat bottom includes a hollow bottom shell portion, the seat back includes a hollow top shell portion that cooperates with the bottom shell portion to form the interior region, the top load-limiter bar is located in the hollow top shell portion of the seat back, and the bottom load-limiter bar is located in the hollow bottom shell portion of the seat bottom.

14. The child restraint of claim 11, wherein the rigidifying truss further includes an upper beam stabilizer arranged to interconnect upper portions of the first and second stiffener beams and lie in a portion of the interior region formed in the seat back and between the top and bottom load-limiter bars and a lower beam stabilizer arranged to interconnect lower portions of the first and second stiffener beams and lie in a portion of the interior region formed in the seat bottom.

15. The child restraint of claim 1, wherein the rigidifying truss includes a first stiffener beam and a second stiffener beam arranged to lie in spaced-apart relation to the first stiffener beam and the top load-limiter bar is arranged to extend laterally between and is coupled to each of the first and second stiffener beams.

16. The child restraint of claim 15, wherein the seat back includes a bottom portion arranged to lie in closely confronting relation to the seat bottom and a distal top portion arranged to lie above and in spaced-apart relation to the bottom portion and the top load-limiter bar is arranged to lie in close proximity to the top portion of the seat back.

17. The child restraint of claim 15, wherein the top load-limiter bar has a first end coupled to the first stiffener beam, an opposite second end coupled to the second stiffener beam, and a middle portion arranged to extend between the first and second ends of the top load-limiter bar and to mate with the eat-back tether strap to cause the top load-limiter bar to deform inelastically to assume a new shape in response to a load applied to the middle portion of the top load-limiter bar by the seat-back tether strap during exposure of a vehicle carrying the juvenile seat to an external impact force to reduce a load applied to a child seated on the seat bottom during such exposure by the child-restraint harness.

18. The child restraint of claim 17, wherein the middle portion of the top load-limiter bar is round.

19. The child restraint of claim 17, wherein the initial shape of the top load-limiter bar is straight.

20. The child restraint of claim 15, wherein the top load-limiter bar includes a first end arranged to extend into a bar-receiving chamber formed in the upper portion of the first stiffener beam, an opposite second end arranged to extend into a bar-receiving chamber formed in the upper portion of the second stiffener beam, and a middle portion coupled to the seat-back tether strap to move therewith relative to the first and second stiffener beams to cause movement of the first and second ends of the top load-limiter bar in companion bar-receiving chambers during deformation of the top load-limiter bar to change shape from the initial shape to the deformed shape.

21. A child restraint comprising
a juvenile seat including a seat bottom and a seat back extending upwardly from the seat bottom,
a rigidifying truss coupled to the juvenile seat to lie in a stationary position relative to the seat back, and
an energy-dissipation system including a bottom load-limiter bar coupled to the rigidifying truss and made of a deformable shape-changeable material to assume an initial shape and a child-restraint harness coupled to the juvenile seat and formed to include a crotch belt wrapped around a portion of the bottom load-limiter bar to provide means for deforming the bottom load-limiter bar to dissipate energy and change shape inelastically from the initial shape to a deformed shape in response to a bar-deforming load applied to the bottom load-limiter bar by the crotch belt during movement of a child seated on the seat bottom and restrained by the child-restraint harness to tension shoulder belts and the crotch belt included in the child-restraint harness following a sudden stop of a moving passenger vehicle carrying the vehicle seat.

22. The child restraint of claim 21, wherein the rigidifying truss includes a first stiffener beam and a second stiffener beam arranged to lie in spaced-apart relation to the first stiffener beam and the bottom load-limiter bar is arranged to extend laterally between and is coupled to each of the first and second stiffener beams.

23. The child restraint of claim 22, wherein the seat back includes a bottom portion arranged to lie in closely confronting relation to the seat bottom and a distal top portion arranged to lie above and in spaced-apart relation to the bottom portion and the bottom load-limiter bar is arranged to lie in close proximity to the seat bottom and the bottom portion of the eat back.

24. The child restraint of claim 22, wherein the bottom load-limiter bar has a first end coupled to the first stiffener beam, an opposite second end coupled to the second stiffener beam, and a middle portion arranged to extend between the first and second ends of the bottom load-limiter bar and to mate with the crotch belt to cause the bottom load-limiter bar to deform inelastically to assume a new shape in response to a load applied to the middle portion of the bottom load-limiter bar by the crotch belt during exposure of a vehicle carrying the juvenile seat to an external impact force to reduce a load applied to a child seated on the seat bottom during such exposure by the child-restraint harness.

25. The child restraint of claim 22, wherein the bottom load-limiter bar includes a first end arranged to extend into a bar-receiving chamber formed in the first stiffener beam, an opposite second end arranged to extend into a bar-receiving chamber formed in the second stiffener beam, and a middle portion coupled to the crotch belt to move therewith relative to the first and second stiffener beams to cause movement of the first and second ends of the bottom load-limiter bar in companion bar-receiving chambers toward one another during deformation of the bottom load-limiter bar to change from the initial shape to the deformed shape.

26. The child restraint of claim 21, wherein the seat bottom and seat back cooperate to define a hollow seat shell having an interior region containing the rigidifying truss and the bottom load-limiter bars.

27. The child restraint of claim 21, wherein the rigidifying truss includes a first stiffener beam on a first side of the hollow seat shell and a second stiffener beam on an opposite second side of the hollow seat shell, the seat bottom includes an exterior surface adapted to support a child sitting on the seat bottom and arranged to lie in a reference plane bifurcating each of the first and second stiffener beams into a lower beam portion lying below the reference plane and an upper beam portion lying above the reference plane, and the bottom load-limiter bar is coupled to lower beam portions of each of the first and second stiffener beams.

28. The child restraint of claim 27, wherein the bottom load-limiter bar is arranged to lie in a position not located under the exterior surface of the seat bottom.

29. The child restraint of claim 27, wherein the seat bottom includes a hollow bottom shell portion, the seat back includes a hollow top shell portion that cooperates with the bottom shell portion to form the interior region, and the bottom load-limiter bar is located in the hollow bottom shell portion of the seal bottom.

30. The child restraint of claim 27, wherein the rigidifying truss further includes an upper beam stabilizer arranged to interconnect upper portions of the first and second stiffener beams and lie in a portion of the interior region formed in the seat back and above the bottom load-limiter bar and a lower beam stabilizer arranged to interconnect lower portions of the first and second stiffener beams and lie in a portion of the interior region formed in the seat bottom.

31. A child restraint comprising
a juvenile seat including a seat bottom and a seat back extending upwardly from the seat bottom,
a rigidifying truss coupled to the juvenile seat and configured to include first and second stiffener beams arranged to lie in spaced-apart relation to one another, and
an energy-dissipation system including top and bottom load-limiter bars, wherein the top load-limiter bar is coupled to upper portions of the first and second stiffener beams and to a seat-back tether strap adapted to be anchored to a passenger vehicle carrying the juvenile seat and configured to deform to dissipate energy applied to the juvenile vehicle seat via the seat back tether strap during exposure of the passenger vehicle to an external impact force and wherein the bottom load-limiter bar is coupled to lower portions of the first and second stiffener beams and to a crotch belt included in a child-restraint harness coupled to the juvenile eat and configured to deform the dissipate energy applied to the juvenile vehicle seat via the crotch belt during exposure of the passenger vehicle to an external impact force.

32. The child restraint of claim 31, wherein each of the first and second stiffener beams is J-shaped and includes a lower portion associated with the seat bottom and an upper portion associated with the seat back and the juvenile seat further includes fasteners coupled to each stiffener beam and to the seat bottom and to the seat back to fix the first and second stiffener beams in a stationary spaced-apart relation to one another.

* * * * *